United States Patent
Levin et al.

(10) Patent No.: US 9,251,518 B2
(45) Date of Patent: Feb. 2, 2016

(54) CENTRALIZED AND DEVICE-AWARE TICKET-TRANSFER SYSTEM AND METHODS

(71) Applicant: Live Nation Entertainment, Inc., Beverly Hills, CA (US)

(72) Inventors: Samuel Levin, Los Angeles, CA (US); David Scarborough, Ashburn, VA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 9 days.

(21) Appl. No.: 14/202,218

(22) Filed: Mar. 10, 2014

(65) Prior Publication Data

US 2014/0279615 A1 Sep. 18, 2014

Related U.S. Application Data

(60) Provisional application No. 61/791,123, filed on Mar. 15, 2013.

(51) Int. Cl.
*G06Q 30/00* (2012.01)

(52) U.S. Cl.
CPC .................................. *G06Q 30/0185* (2013.01)

(58) Field of Classification Search
CPC ............................... G06Q 20/36; G06Q 10/02
See application file for complete search history.

(56) References Cited

U.S. PATENT DOCUMENTS

| | | | |
|---|---|---|---|
| 5,496,991 A | 3/1996 | Delfer et al. | |
| 5,598,477 A | 1/1997 | Berson | |
| 6,023,685 A | 2/2000 | Brett et al. | |
| 6,067,532 A * | 5/2000 | Gebb | 705/37 |
| 6,068,183 A | 5/2000 | Freeman et al. | |
| 6,094,640 A * | 7/2000 | Goheen | 705/5 |
| 6,107,932 A * | 8/2000 | Walker et al. | 340/5.22 |
| 6,149,055 A | 11/2000 | Gatto | |
| 6,175,922 B1 | 1/2001 | Wang | |
| 6,216,227 B1 | 4/2001 | Goldstein et al. | |
| 6,223,166 B1 | 4/2001 | Kay | |

(Continued)

FOREIGN PATENT DOCUMENTS

EP 950968 A1 10/1999
WO 99/26203 A1 5/1999

OTHER PUBLICATIONS

Lumpur, K. "Wanted Live in Concert postponed to after Raya", New Straits Times, Oct. 25, 2000, 2 pages.

(Continued)

*Primary Examiner* — Traci Casler
(74) *Attorney, Agent, or Firm* — Kilpatrick Townsend & Stockton LLP

(57) ABSTRACT

User accounts can allow respective users to access any their respectively owned ticket. Each ticket in a group of tickets provides its owner the right to redeem the ticket to attend a particular event. A first user initially owns a ticket in the group. Ownership of the ticket is transferred from the first user to a second user, such that, subsequent to the transfer, the second user has the right to redeem the ticket but the first user does not. A code is generated for the ticket, the code being based on a characteristic of a device associated with the second user. The code is unique across codes in the group of tickets. Redeeming the ticket to attend the particular event includes analyzing the code. A history for the ticket can be stored, the history including an indication of the transfer occurrence.

20 Claims, 9 Drawing Sheets

(56) References Cited

U.S. PATENT DOCUMENTS

| | | | |
|---|---|---|---|
| 6,240,396 B1 | 5/2001 | Walker et al. | |
| 6,496,809 B1 * | 12/2002 | Nakfoor | 705/80 |
| 6,556,548 B1 | 4/2003 | Kirkby et al. | |
| 6,738,750 B2 | 5/2004 | Stone et al. | |
| 6,910,627 B1 | 6/2005 | Simpson-Young et al. | |
| 7,003,485 B1 | 2/2006 | Young | |
| 7,171,472 B2 | 1/2007 | O'Brien et al. | |
| 7,177,945 B2 | 2/2007 | Hong et al. | |
| 7,228,313 B1 | 6/2007 | Hand et al. | |
| 7,228,350 B2 | 6/2007 | Hong et al. | |
| 7,333,943 B1 | 2/2008 | Charuk et al. | |
| 7,403,993 B2 | 7/2008 | John et al. | |
| 7,849,133 B2 * | 12/2010 | Denker et al. | 709/203 |
| 8,131,572 B2 * | 3/2012 | Nakfoor | 705/5 |
| 8,294,549 B2 * | 10/2012 | Samovar et al. | 340/5.2 |
| 8,346,580 B2 * | 1/2013 | Nakfoor | 705/5 |
| 8,543,813 B2 * | 9/2013 | Feng et al. | 713/160 |
| 8,645,218 B2 * | 2/2014 | Fraser et al. | 705/26.1 |
| 8,849,720 B2 * | 9/2014 | Nestor et al. | 705/59 |
| 2002/0023955 A1 | 2/2002 | Frank et al. | |
| 2002/0042729 A1 | 4/2002 | Yajima et al. | |
| 2002/0094090 A1 * | 7/2002 | Iino | 380/282 |
| 2002/0143860 A1 | 10/2002 | Catan | |
| 2002/0174026 A1 | 11/2002 | Pickover et al. | |
| 2002/0178226 A1 | 11/2002 | Anderson et al. | |
| 2002/0188523 A1 | 12/2002 | Hyyppa et al. | |
| 2003/0023500 A1 | 1/2003 | Boies et al. | |
| 2003/0024988 A1 | 2/2003 | Stanard | |
| 2003/0069827 A1 * | 4/2003 | Gathman et al. | 705/37 |
| 2003/0185197 A1 | 10/2003 | Banerjee et al. | |
| 2003/0229790 A1 * | 12/2003 | Russell | 713/172 |
| 2004/0006497 A1 * | 1/2004 | Nestor et al. | 705/5 |
| 2004/0015404 A1 | 1/2004 | McCarthy | |
| 2006/0081704 A1 * | 4/2006 | Boyd | 235/382 |
| 2006/0155857 A1 | 7/2006 | Feenan et al. | |
| 2006/0293929 A1 * | 12/2006 | Wu et al. | 705/5 |
| 2007/0022020 A1 | 1/2007 | Bernstein | |
| 2007/0245351 A1 | 10/2007 | Sussman et al. | |
| 2008/0154623 A1 * | 6/2008 | Derker et al. | 705/1 |
| 2009/0030744 A1 * | 1/2009 | Yamada | 705/5 |
| 2011/0125538 A1 * | 5/2011 | Joao | 705/5 |
| 2011/0238454 A1 | 9/2011 | Nestor et al. | |
| 2013/0311214 A1 | 11/2013 | Marti et al. | |

OTHER PUBLICATIONS

Milwaukee Journal Sentinel, "Riverside comedy show canceled", Aug. 2, 1996, Milwaukee, Wis, 1 page.

Schacher, Y, "Ticket Scalping", Gotham Gazette, Jun. 11, 2001, http://www.gothamgazette.com/article//20010611/200/165, 5 pages.

Stubhub, "Buyer Handbook", Apr. 2, 2002, www.stubhub.com, 48 pages.

* cited by examiner

CENTRALIZED AND DEVICE-AWARE TICKET-TRANSFER SYSTEM AND METHODS

CROSS-REFERENCES TO RELATED APPLICATIONS

This application claims the benefit of and priority to U.S. Patent Application No. 61/791,123, filed Mar. 15, 2013, entitled "CENTRALIZED AND DEVICE-AWARE TICKET-TRANSFER SYSTEM AND METHOD", which is hereby incorporated by reference in its entirety for all purposes.

BACKGROUND

This disclosure relates in general to transferring tickets and tracking the transfers.

A variety of events and services are only open to a limited population. For example, a venue (e.g., concert venue) may only be able to host a specific number of people. As another example, an organization's staff may be insufficient to serve (e.g., serve a dinner to) more than a set number of people. As yet another example, a company may be capable of providing a service (e.g., performing a show) to a large group of people but may nonetheless want to restrict the served population to those that have paid for the service or to those invited to receive the service.

One strategy for accommodating these realities is to issue tickets. The number of issued tickets may then be capped, and/or the issuance may be conditioned upon payment for the ticket. However, ticket issuances can be disadvantageous for both the party who issues the ticket and for the party who receives the ticket. For the party issuing the ticket, fraud is a concern, as third parties may attempt to copy the ticket, which may strain venue or service capacity and/or reduce profits. For the party receiving the ticket, the ticket may be lost or be inconvenient to access.

SUMMARY

In one embodiment, the present disclosure provides a method and system for managing assignments of tickets to users. A vendor identifies an offer to attend an event or receive a service. The offer may be tied to restrictions, such as restrictions specifying a maximum number of offer acceptances to allow or a restricted date period for redeeming a ticket for the event or service. Based on the vendor-identified information, an electronic offer is generated and presented to a first user (e.g., and potentially other users as well). The first user accepts the offer, in part, by sending a payment (e.g., by agreeing to an electronic credit-card payment). It may be required that the first user be logged into his account in order to accept the offer. An electronic ticket is then issued and stored in a database, such that the ticket is designated as being owned by the first user. The ticket ownership indicates that the first user has a right to redeem the ticket for the offered event attendance or service.

Subsequently, activity from one or both of the first user and a second user is detected (e.g., while the user(s) are logged into his account), which initiates a transfer of the ticket from being owned by the first user to being owned by the second user. For example, the first user may offer the ticket for sale (e.g., at a fixed price or using an auction), and a second user may send payment to receive the ticket. In some instances, this transfer requires that one or both of the users submit payment, which may be sent to one or more of: the other user, the vendor or a party operating the system for managing assignments of the tickets. A history of the ticket is tracked and stored. A characteristic of the transfer (e.g., a date, a price, an identification of the first user, and/or an identification of the second user) is stored as part of this history.

A characteristic of a device (e.g., a media access control address) of the second user is detected, and a code is generated based on this characteristic. The characteristic may be detected, e.g., while the second user is using the device to accept or request the transfer, to access (e.g., view) the transferred ticket or to otherwise interact with his account before or after the transfer. Thus, in some instances, the code is generated prior to or during the transfer, and in some instances, the code is generated after the transfer. The code is presented on the ticket. This presentation can include a physical representation (e.g., such that the code appears on a physical copy of the ticket or on a virtual representation of the ticket) or a virtual representation (e.g., such that, when a ticket is redeemed via wireless transfer of ticket information, transmission of the code is included in the transfer). In some instances, the code presentation occurs only when a date for the event or service nears (e.g., is less than three days away) or when the second user accesses the ticket after the transfer.

The second user can then view the ticket of his electronic device and redeem it by showing the ticket to an agent or via wireless communication between his electronic device an electronic device of an agent (e.g., by tapping the devices and utilizing near-field communication or radio frequency identification). The encoded device characteristic can be automatically compared to a comparable characteristic of the presenting device (e.g., by using the presenting device or the device of the agent). If the characteristics are not the same, the ticket may be identified as being invalid.

Thus, a centralized system can be used to issue, transfer and/or use tickets and to track the transfers. The party operating the system and/or vendors can then identify transfer and use patterns and can potentially profit from transfers. Users involved in transfers can rely on the centralized system to ensure rapid and guaranteed payment and/or to ensure ticket validity. Further, the device-identifying codes can prevent fraud attempts, such as attempting to use a copied ticket.

In some embodiments, a ticket management system for centrally and dynamically managing assignments of tickets to users is provided, An account engine allows a first user to access a first account. The first account is configured to have the capability of allowing the first user to access any tickets owned by the first user. The first user owns a ticket. Ownership of a ticket by a user provides the user with the right to redeem the ticket to attend an event. A group of tickets includes the ticket. All tickets in the group of tickets provide respective users owning the ticket the right to redeem it to attend a particular event. The account engine further allows a second user to access a second account. The second account is configured to have the capability of allowing the second user to access any tickets owned by the second user. A ticket transferer transfers ownership of the ticket from the first user to the second user, such that, subsequent to the transfer, the second user has the right to redeem the ticket but the first user does not. A code is generated for the ticket, the code being based on a characteristic of a device associated with the second user. The code is unique across codes in the group of tickets. Redeeming the ticket to attend the particular event includes analyzing the code.

In some embodiments, a method is provided for centrally and dynamically managing assignments of tickets to users. A first user is allowed to access a first account. The first account is configured to have the capability of allowing the first user to access any tickets owned by the first user. The first user owns a ticket. Ownership of a ticket by a user provides the user with the right to redeem the ticket to attend an event. A group of tickets includes the ticket. All tickets in the group of tickets provide respective users owning the ticket the right to redeem it to attend a particular event. A second user is allowed to access a second account. The second account is configured to have the capability of allowing the second user to access any tickets owned by the second user. Ownership of the ticket is transferred from the first user to the second user, such that, subsequent to the transfer, the second user has the right to redeem the ticket but the first user does not. A code is generated for the ticket, the code being based on a characteristic of a device associated with the second user. The code is unique across codes in the group of tickets. Redeeming the ticket to attend the particular event includes analyzing the code.

In some embodiments, a ticket management system for centrally and dynamically managing assignments of tickets to users is provided. The ticket management system includes one or more processors and one or more memories coupled with the one or more processors. The one or more processors and one or more memories are configured to allow a first user to access a first account. The first account is configured to have the capability of allowing the first user to access any tickets owned by the first user. The first user owns a ticket. Ownership of a ticket by a user provides the user with the right to redeem the ticket to attend an event. A group of tickets includes the ticket. All tickets in the group of tickets provide respective users owning the ticket the right to redeem it to attend a particular event. The one or more processors and one or more memories are further configured to allow a second user to access a second account. The second account is configured to have the capability of allowing the second user to access any tickets owned by the second user. The one or more processors and one or more memories are also configured to transfer ownership of the ticket from the first user to the second user, such that, subsequent to the transfer, the second user has the right to redeem the ticket but the first user does not. The one or more processors and one or more memories are still further configured to generate a code for the ticket, the code being based on a characteristic of a device associated with the second user. The code is unique across codes in the group of tickets. Redeeming the ticket to attend the particular event includes analyzing the code.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
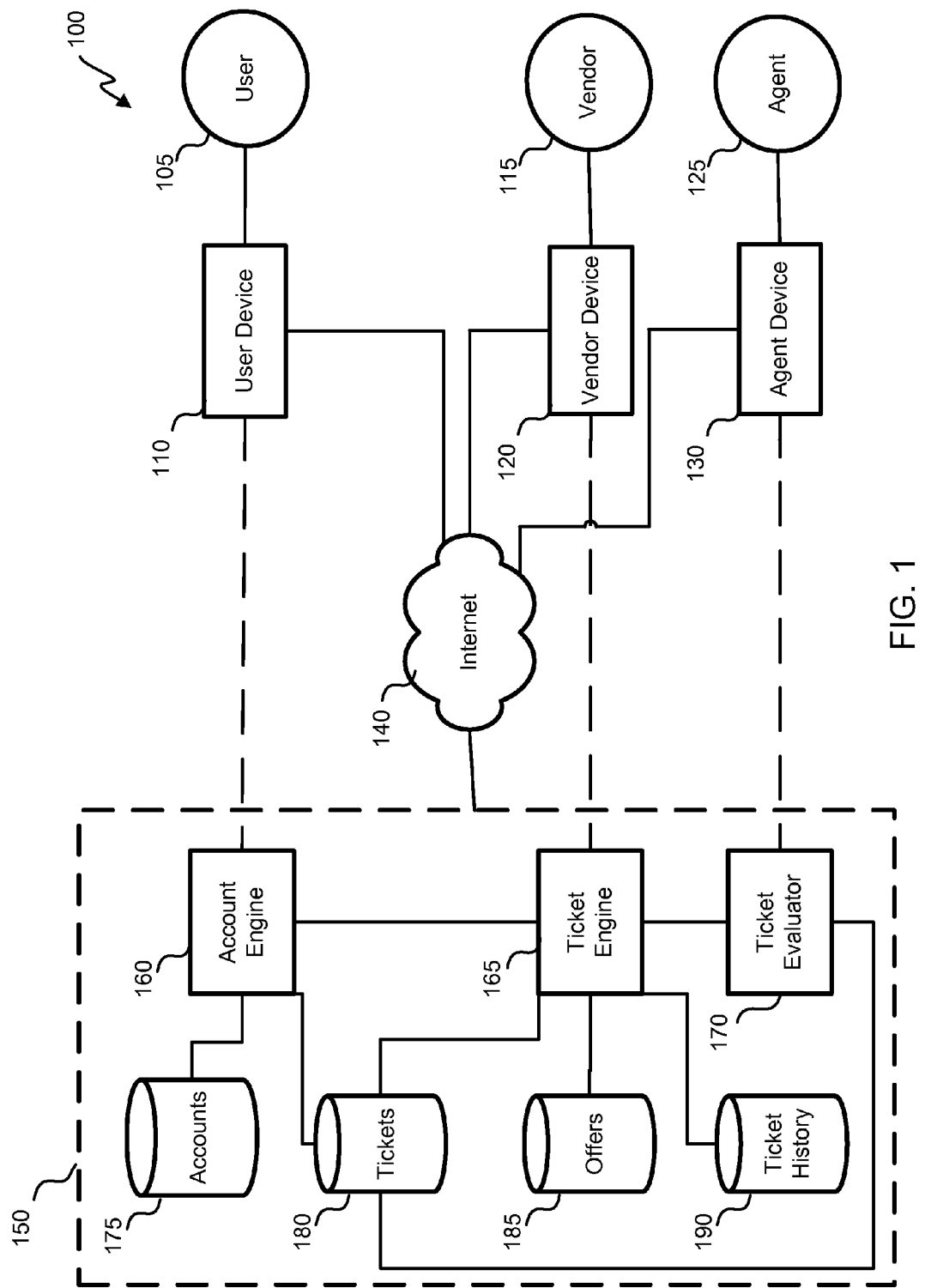
FIG. 1 depicts a block diagram of an embodiment of a ticket interaction system.

Referring first to FIG. 1, a block diagram of an embodiment of a ticket interaction system 100 is shown. Users 105, vendors 115 and agents 125 can interact with a ticket management system 150 via respective devices 110, 120 and 130 and a network, such as the Internet 140 or a wide area network (WAN), local area network (LAN) 114 or other backbone. In some embodiments, ticket management system 150 is made available to one or more of users 105, vendors 115 and agents 125 via an app (that can be downloaded to and executed on a portable electronic device) or a website. It will be understood that, although only one user 105, vendor 115 and agent 125 are shown, system 100 can include multiple users 105, vendors 115 and/or agents.

Using the ticket management system 150, a vendor 115 can identify an event or service, a price of attending the event or receiving the service, a date or dates of the event or service, a location or locations of the event or service, etc. Examples of events or services for which tickets can be obtained include sporting events, concerts, meals, shows, movies, amusement parks and massages.

A user 105 can then obtain (e.g., by purchasing) a ticket for the event or service. The ticket provides the user with a right, such as a right to attend an event or receive a service. The right can, however, be restricted (e.g., based on an expiration date, prohibited dates of redemption, etc.). In some instances, a ticket can be equivalent to a voucher, gift card, and/or coupon, which may be valid for use for an absolute amount, a percentage amount, or a functional amount (e.g., three movie tickets). The ticket may be electronic or tangible and may change between the states (e.g., being electronic when purchased but tangible after a user prints it). A user 105 can attempt to redeem a ticket by, e.g., giving a printed version of the ticket to an agent 125, showing a view of an electronic version of the ticket to an agent 125 or transmitting (e.g., wirelessly transmitting using near-field communication or radio frequency identification) to a device 130 of the agent. The agent 125 or agent device 130 can assess the redemption attempt by, e.g., scanning a barcode on the surrendered or shown ticket or processing the transmitted information.

In some instances, one user can transfer (e.g., sell or transfer without receiving payment) a ticket to another user. The vendor 115 and/or a central party (e.g., one controlling the ticket management system 150) can restrict user-to-user transfers and/or collect a fee for any such transfer. As will be described further below, a ticket obtained by a user 105 can include a code tied to the user (e.g., specific to a device 110 of the user), such that a valid transfer requires that the ticket be modified or a new ticket be generated, the modified or new ticket including a code different from one that was or would have been generated for the initial ticket.

User 105 can use the ticket management system 150 to access a ticket (e.g., a transferred ticket or one initially purchased from a vendor). The access may include, e.g., viewing the ticket, transferring information about the ticket to another device (e.g., by tapping user device 110 with agent device 130), or printing the ticket. Either agent device 130 (which may be used to scan a portion of the viewed or printed ticket or to receive the transferred information) or user device 105 may assess the validity of the ticket. This assessment may involve comparing at least part of a code of the ticket to a control code generated based on which device was used to transmit or access the ticket, offer data and/or ticket-history data. Thus, the assessment may include determining whether the ticket itself is a valid ticket, whether the ticket is being presented for the appropriate event or service, and/or whether the appropriate user 105 and/or user device 110 is attempting to redeem the ticket. Agent 125 can use the assessment to either allow or not allow user 105 to attend an event or to receive a service. Agent 125 can be an agent of the vendor 115, an agent of a venue, an agent of an act, a ticket taker, etc.

User device 110, vendor device 120 and/or agent device 130 can each be a single electronic device, such as a handheld electronic device. For example, user device 110 may be a smartphone, and agent device 130 may be a handheld ticket scanner. It will be understood that user device 110, vendor device 120 and/or agent 130 may also include a system that includes multiple devices and/or components. The device(s) 110, 120 and/or 130 may comprise a computer, such as the desktop computer, a laptop computer or a tablet. In some instances, a party 105, 115 and/or 125 uses different devices at different times to interact with the ticket management system 150. For example, user 105 may use a desktop computer initially to purchase a ticket, and user 105 may later use a smartphone to access the purchased ticket and redeem it at an event.

Ticket management system 150 includes an account engine 160, a ticket engine 165, and a ticket evaluator 170. As shown, different parties can primarily communicate with different components of the system 150. Specifically, user 105 can primarily communicate with account engine 160, vendor 115 can primarily communicate with ticket engine 165, and agent 125 can primarily communicate with ticket evaluator 170. It will be understood that the communications may extend beyond these pairings.

Ticket management system 150 may be, in part or in its entirety, in a cloud. In some instances, at least part of ticket management system 150 is present on a device, such as a user device 110, vendor device 120 and/or agent device 130. For example, the entirety of icket evaluator 170 may be on agent device 130 based on an app downloaded to device 130, while some or all of ticket engine 165 may reside in a cloud. In some instances, part of a component (e.g., part of ticket engine 165 or part of a component of ticket engine 165) resides in a cloud and another part of the component resides in a device. Thus, ticket management system 150 may include a distributed system.

Account engine 160 may be used to set up accounts for users. Each account may be associated with a profile, which may include information about a particular user 105, such as his name, email address, credit card information, home address, phone number, types of events or services of interest, etc. Once an account is created, a user may access the account by entering a username and password. Alternatively, such login information may be saved, or cookies may be utilized such that the user is always logged in while using a particular device. Once logged in, a user may purchase tickets, transfer tickets and/or access tickets (e.g., by printing or viewing the tickets or by transmitting information about the tickets). Account information (including profile and login information) is stored in an account database 175. Use of the accounts has advantages for multiple parties. For users 105, it enables them to repeatedly view tickets, potentially exchange tickets and see new tickets of potential interest. Tying tickets to accounts or user devices can also reduce the risk of a ticket being misplaced or stolen. The reduced risk of fraud is also advantageous for vendors. Further, system 150 provides vendors 115 with the potential to track tickets in order to be able to characterize actual event/service attendees (such that advertising and event scheduling can be accordingly revised to accommodate the market), to understand actual values of the tickets, and to identify when end-users actually purchase tickets.

Ticket management system 150 includes one or more ticket databases 180. In one instance, ticket database 180 is a central database. Individual tickets can then be associated with specific users as they are purchased or transferred. For example, a ticket code may include information the user or user device, where a ticket can be associated with (e.g., in an identifier matrix) user identifier. In another instance, a plurality of ticket databases 180 exist, and accounts can be tied to specific databases. For example, a first user may have a dedicated ticket database 180, which may include tickets presently "owned" by that user (owned tickets being those that the user has the right to redeem).

Ticket management system 150 includes an offer database 185, which stores information about offers to attend specific events or receive services. This information may be generated based on data input by vendors 115. The offer information may be used to advertise the offers to users 105, such that users 105 can purchase tickets for particular events or services. Further, in some embodiments, ticket evaluator 170 may be coupled to offer database 185, such that the offer information may be used to confirm that the ticket presented by a user 105 is valid for a given event or service. For example, an offer for an event may be associated with an event code, and each valid ticket may then have the event code on the ticket. To perform the ticket validation, the event code may be identified from the offers database 185 and checked against that on the ticket.

Ticket management system 150 also includes a ticket-history database 190. Ticket engine 165 tracks individual tickets throughout each ticket's life. For example, ticket engine 165 can identify when a ticket was actually purchased, which user purchased it, and the price paid for the ticket. Subsequently, ticket engine 165 can detect a transfer of the ticket from one user to another user, when the transfer occurred and a price paid for the transfer. In some instances, some or all of the ticket history associated with events or services of a particular vendor is provided to the vendor (e.g., routinely, upon request and/or for a fee).

Figure 2:
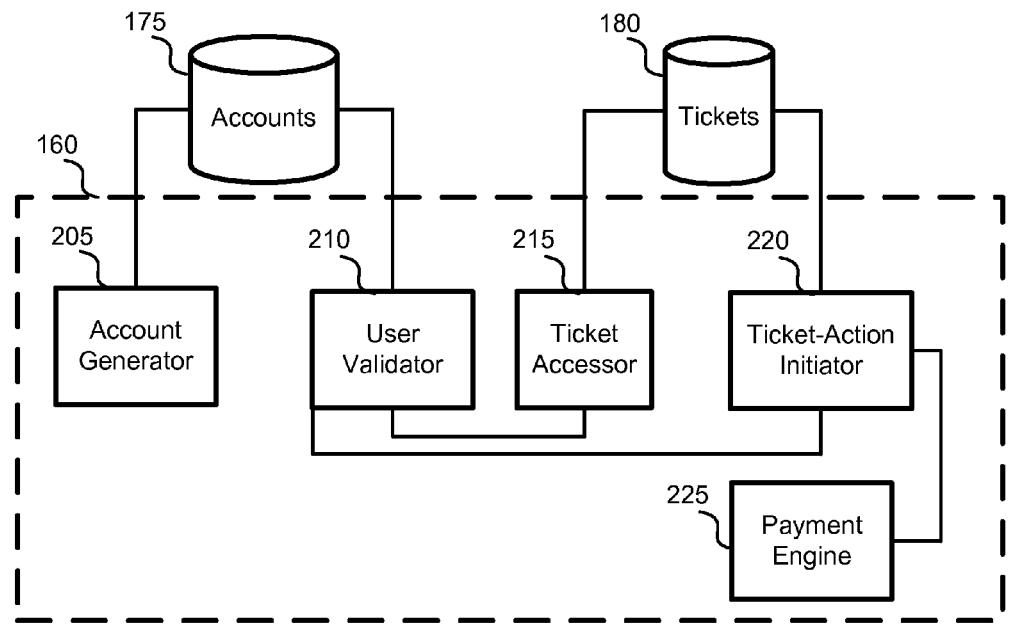
FIG. 2 depicts a block diagram of an embodiment of an account engine.

Referring next to FIG. 2, a block diagram of an embodiment of account engine 160 is shown. Ticket management system 180 may limit the actions by the user 105 may perform until or unless he creates and logs into an account. For example, the user 105 may be unable to view any offers, search for offers, purchase tickets, transfer tickets and/or access purchased tickets until or unless he walks into his account.

User 105 can interact with an account generator 205 in order to create an account. In this process, the user may be asked to provide information about himself, such as his name, email address, telephone number, home address, types of events or services of interest and/or payment information, such as credit-card numbers. In some instances, account generation is free, and in some instances, generation requires a fee. User 105 may also be asked to provide a username and password. During the generation, user 105 may be asked to agree to certain terms of service. For example, user 105 may be asked to agree to receive notifications of offers and/or promotions. Completion of the account generation may be conditioned upon receiving information from the user and/or his agreement to terms of service. Account generator 205 stores account information (i.e., personal information and/or login information) in account database 175.

Subsequently, when user 105 attempts to access his account (by logging into his account or opening an app associated with ticket management system 150), a user validator 210 can verify that such access is permissible. For example, user validator 210 may ensure that a username and password matches that of an account stored in database 175. As another example, user validator 210 can ensure that user 105 had not previously logged off of his account on a particular electronic device.

Once the verification is complete, user validator 210 grants user 105 access to his account, and a ticket accessor 215 grants user 105 access to tickets owned by user 105 and associated with the account. Further, a ticket-action initiator 220 can present available ticket-related actions (e.g., the option to search for offers, purchase tickets, transfer tickets and/or access tickets) and detect when a user is attempting to perform a given action. Ticket-action initiator 220 communicates with ticket generator 165 both to identify which offers are available to a user (e.g., such that some or all of the available offers may be presented or presented in response to a query) and to indicate to ticket engine 165 when a user is attempting to perform a ticket-related action.

In some instances, the ticket-related action requires that a user 105 submit a payment. For example, in order to obtain a ticket, the user many need to pay for the ticket. In some instances, the ticket-based action results in the user 105 receiving payment. The collection or receipt of the payment may be handled by a payment engine 225. Payment engine 225 may collect credit-card information and/or bank-account information. Payment engine 225 may also receive entry of a payment amount and/or collect an indication of the user's agreement to submit or collect a particular payment.

Figure 3:
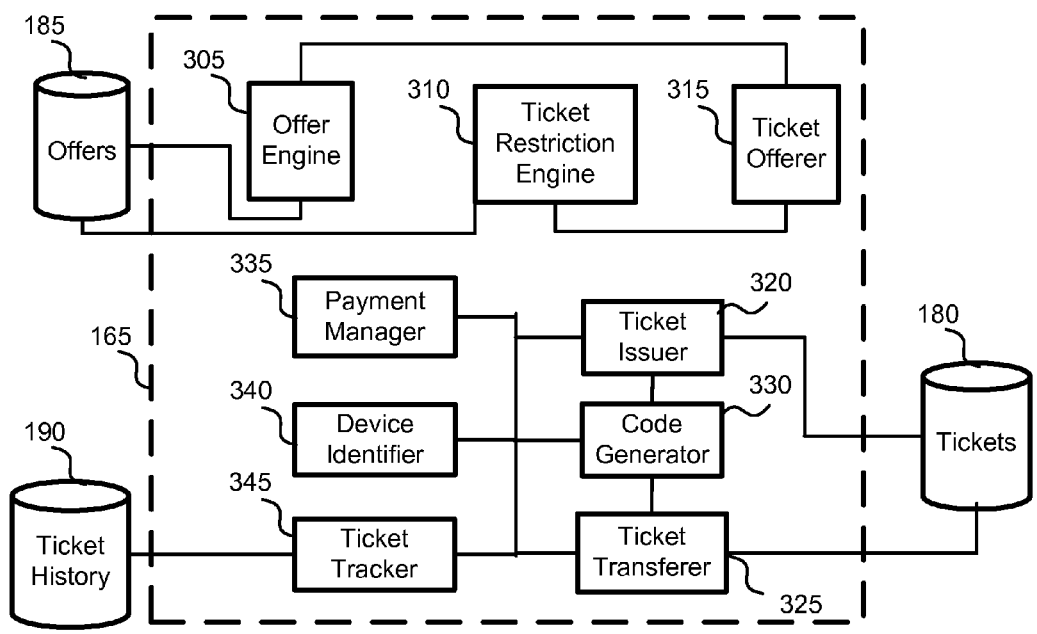
FIG. 3 depicts a block diagram of an embodiment of a ticket engine.

Referring next to FIG. 3, a block diagram of an embodiment of ticket engine 165 is shown. Ticket engine 165 includes an offer engine, which collects information about particular offers. For example, the information can identify an event or service for which the offer is available, time or times of the event or service, location or locations of the event or service, a price or prices for a ticket to or for the event or service, or a minimum price for a ticket to the event or service. The information may further include a time period during which the offer is to be made available. The information is typically received from a vendor, but the information may be obtained via a user 105 when the user wishes to transfer a ticket.

A ticket restriction engine 310 receives information about restrictions on the offer. For example, a vendor may limit a number of tickets available for a particular event. As another example, a vendor may indicate that tickets are only to be issued to users indicating that they are 18 or older. As yet another example, a vendor may indicate that use of a ticket requires a purchase, such as a purchase of the dinner while attending a show.

The offer information and any associated restrictions are stored in offer database 185. A ticket offerer 315 generates one or more presentations of the offer, which may include high-level information, short summaries and/or graphics. Ticket offerer 315 then presents (e.g., electronically presents) the presentation of the offer to some or all users 105. The offer can be presented via an app. For example, a user 105 can be presented with a summary of an event upon initially accessing the app, or a user 105 may be presented with the summary of the event upon searching for events using the app. In some instances, the offer is sent to users 105 (e.g., via email or text message). In some instances, offer information is only presented to or sent to users 105 with an account for the ticket management system 150, but in some instances, offer information is also presented to other users.

Ticket engine 165 includes a ticket issuer 320, which handles the issuances of tickets, and a ticket transferer 325, which handles the transfers of tickets from one user to another. Each of ticket issuer 320 and ticket transferer 325 are connected to payment manager 335, device idenitifier-340 and ticket tracker 345.

Payment manager 335 identifies which parties are to submit or receive payment as a result of the ticket issuance or transfer. For example, payment may be due to a vendor or a first user subsequent to a purchase of a ticket or a transfer to a second user. An entity controlling ticket management system 150 may also be due payment for an issuance or transfer. Payment manager 335 verifies that sufficient funds have been collected by parties who are to receive payment. In some instances, an issuance or transfer is not to be completed unless such payment has been collected.

Ticket issuer 325 or ticket transferer 325 then credits a receiving user with a ticket. This credit may amount to adding a ticket to a database tied to that user or associating a ticket in a central database with the user. The ticket can identify information pertaining to the offer, such as a title or name, description, date or dates, and/or location or locations of the offered event or service and/or any restrictions of the offer. For transfers, the transferring user also loses control of the transferred ticket. A transfer may involve a movement of a ticket (e.g., from one database to another), a modification of ticket-associated information (e.g., identifying the ticket's owner), a modification of the ticket (e.g., to change a code or name on or of the ticket), a deletion of an original ticket and generation of a corresponding new ticket, etc.

At some point in time, device identifier 340 identifies a characteristic of a device associated with the user 105. This identification may occur immediately before or during a ticket issuance or transfer, a fixed time before an event associated with the ticket, or upon determining that the user owning the ticket is attempting to access or redeem the ticket. This identification may require that the user be logged into his account. The identification may be automatic (e.g., to detect a characteristic, such as a media access control (MAC) address, of a device being currently used) or based on a manual entry of a device characteristic. The device may be user device 110, which is used by user 105 while accessing ticket management system 150 while obtaining (e.g., purchasing) a ticket or accessing (e.g., to view or redeem) a ticket. For example, the device may be a smartphone that the user is using while purchase the ticket. However, it will be understood that, in some instances, the user may initially interact with ticket management system 150 but intend to later access (e.g., view and redeem) a purchased ticket using different device. Thus, the device identification may be delayed such that it occurs close to an event's time or upon detecting or predicting that a user is attempting to access a ticket to redeem it. Alternatively, a user may be provided with the option identifying a device characteristic.

Code generator 330 generates a code for a ticket. The code can be generated at the time of issuance or transfer or after the issuance or transfer. Generation of the code can include modification of a previous code (e.g., to append a segment indicative of a transfer or to replace a segment associated with a user who no longer owns the ticket). In some instances, the code is generated upon identification of the device characteristic by device identifier 340. A ticket can be generated or modified to include the code. The code may include an alphanumeric code or a numeric code and/or may be graphically represented, (e.g., by using a barcode such as an EAN code, UPC code, or 3d barcode). Part or all of the code may be encrypted, e.g., using a global, vendor-specific or offer-specific key.

The code may include multiple segments. Segments may be indicative of, e.g., an event or service being offered, a date of an event or service, a seat number, a level of service, an identified device characteristic (e.g., a MAC address), a time and/or date when the code was generated, a time and/or date when the code was received (e.g., at user device 110 from ticket management system 150) and/or a time and/or date when the code was updated. Segments may be concatenated to form a full code.

Ticket tracker 345 tracks actions pertaining to specific tickets. For example, ticket tracker 345 may identify a user to whom ticket is being issued, a date on which the ticket was issued, a ticket purchase price, a ticket transfer date, a user receiving the ticket as a result of the transfer, a transfer price, etc. The tracked history may be stored in ticket-history database 190 and/or represented in at least part of a ticket's code.

Figure 4:
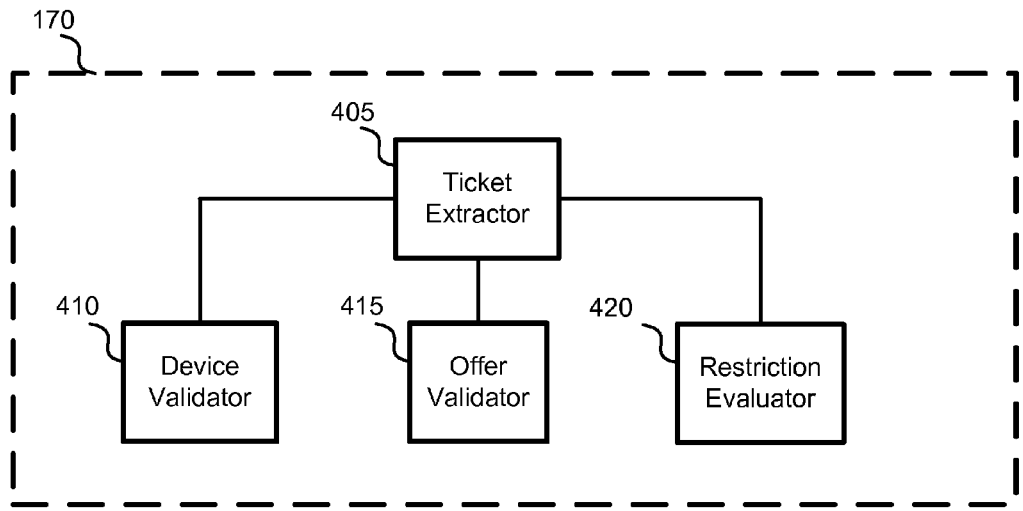
FIG. 4 depicts a block diagram of an embodiment of a ticket evaluator.

Referring next to FIG. 4, a block diagram of an embodiment of ticket evaluator 170 is shown. Ticket evaluator 170 may be included fully or partly in vendor device 105, agent device 130 and/or ticket management system 150. For example, user 105 may select an option on an app on user device 110 to redeem a ticket. User device 110 may determine that the device is the appropriate one to redeem the ticket, and user device 110 may then communicate with ticket management system 150 to determine that the ticket is valid (e.g., not being one that was transferred to another user). As another example, user 105 may use user device 110 to cause ticket information to be wirelessly transmitted to a nearby agent device 130 (e.g., via tapping). The agent device 130 may further receive information identifying user device 110. Using the information, agent device 130 can then determine (e.g., using an app downloaded onto device 130) that user device 110 is the appropriate one to redeem the ticket and that the ticket pertains to a present event or service.

Ticket evaluator 170 accesses at least part of a ticket. For example, an agent 125 may use an agent device 130 to wirelessly receive, to scan or to enter a code on a ticket (e.g., a paper ticket or a ticket displayed electronically on a user device 110). Ticket extractor 405 then extracts information from the accessed at least part of the ticket. In some instances, ticket extractor 405 extracts segments of a code. Various segments can be extracted based on, e.g., known digit placements or segment breaks. For example, a standard format can indicate that the first 17 digits are always to represent a user device or that any sequence of three zeros indicates that that sequences before and after the three zeros are distinct segments. One of the extracted portions of information may be indicative of a user device, and/or one of the extracted portions may be indicative of an offer.

A device validator 410 accesses ticket information identifying a device characteristic. In some instances, this information includes a unique identifier of the device. This information may indicate that the ticket is only valid if presented on the identified device. Device validator 410 can further access identifying information about a device used to present the ticket. This information can be used to determine or estimate that the device being used during an attempt to redeem the ticket is the same as the device for which such a redemption is valid. Such a determination or estimation can be made by comparing the information and determining whether there is a substantial or a complete match. This determination can prevent fraud attempts, such as ones where a third party takes a picture of a ticket and attempts to redeem the ticket by presenting the picture.

An offer validator 415 accesses ticket information identifying an offer. In some instances, this information includes a code segment that corresponds to an offer in offer database 180. Thus, the information may be indicative of what event or service the ticket may grant access to. Offer validator 415 can further access information identifying a particular event or service at hand. For example, a vendor 115 may be provided with an offer code, and the offer code may be entered into ticket scanners at an event. Offer validator 415 then determines or estimates that the ticket is being used for the appropriate event or service by comparing the information and determining whether there is a substantial or a complete match.

A restriction evaluator 420 can access ticket information identifying an offer or ticket information identifying a specific offer restriction. In some instances, the restriction evaluator 420 itself determines whether the restriction prevents use of the ticket. For example, if a restriction prevents use of a ticket between set hours, restriction evaluator 420 can determine whether the attempted use is within those hours. In some instances, the restriction is simply presented to an agent 125 via an agent device 130, such that the agent can determine whether the restriction prevents use of the ticket. Restriction evaluator 420 may require that the agent identify whether the restriction does or does not prevent the ticket's use or not.

The device validation, offer validation and restriction evaluation may be serially performed or performed in parallel. Ticket evaluator 170 may present its evaluation (e.g., of valid, invalid or valid pending a restriction) to an agent 125 via an agent device 130.

Figure 5:
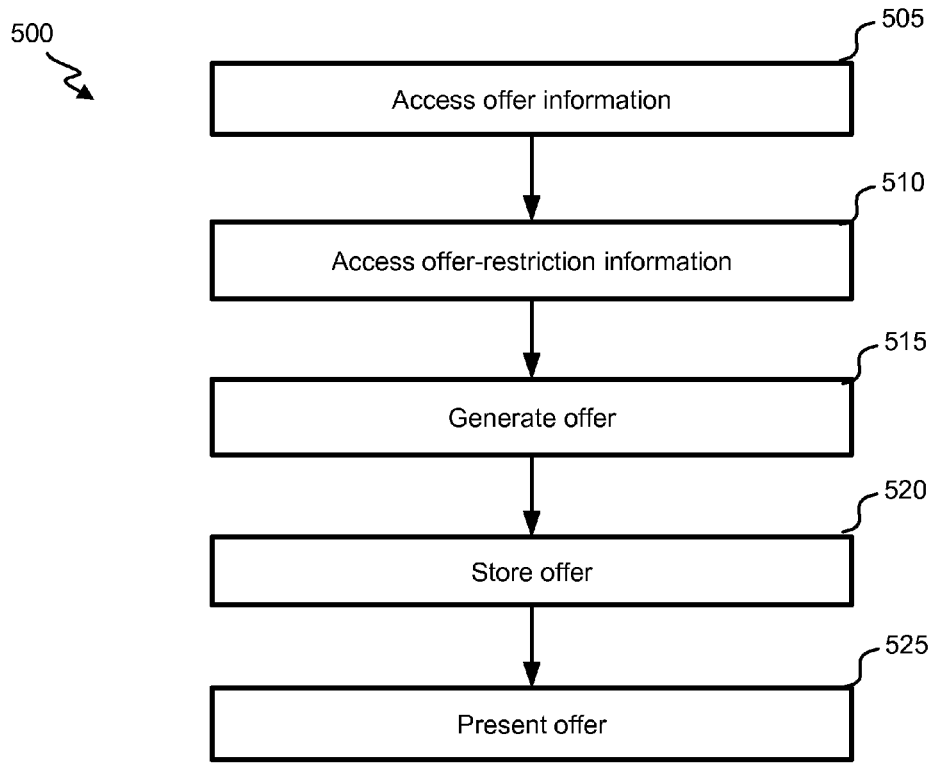
FIG. 5 illustrates a flowchart of an embodiment of a process for presenting offers for tickets to a user.

FIG. 5 illustrates a flowchart of an embodiment of a process 500 for presenting offers for tickets to a user 105. Process 500 begins at block 505, where offer engine 305 accesses information provided by a vendor 115 (e.g., via a vendor device 120) pertaining to an offer. The offer information may identify an event or service available to a population (such as the public or a subset of the public), a date or dates on which the venture service is available, and/or a location or locations at which the event or service is available. At block 510, ticket restriction engine 310 accesses information provided by a vendor 115 identifying restrictions of the offer. For example, a vendor 115 may specify the maximum number of tickets that may be distributed, a price that must be paid before a user 105 may receive a ticket, and/or a time period during which the offer is to be available.

Ticket engine 165 uses the offer information and the restriction information to generate an offer at block 515. The offer is stored in offer database 185 at block 520. The stored offer may include some or all of the offer information and the restriction information and/or identification of the associated vendor 115. The offer may be stored in a standard format. Ticket offerer 315 presents the offer to one or more users 105 at block 525. The users to whom the offer is presented may depend upon search queries of the user, user preferences, users accessing an account within a time period, and/or restrictions of the offer specifying who the offer is to be made available to.

Figure 6:
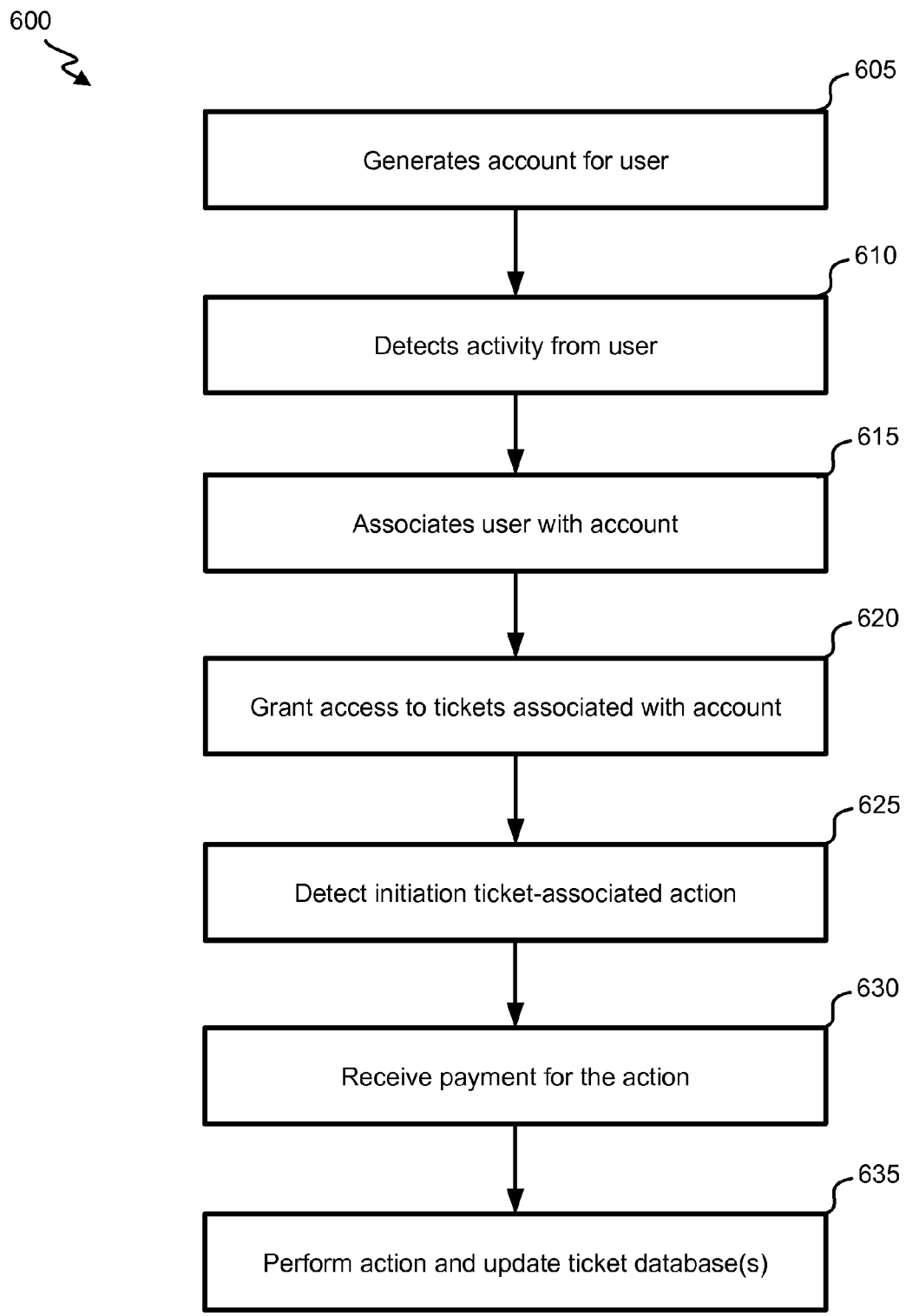
FIG. 6 illustrates a flowchart of an embodiment of a process for responding to a user's initiation of a ticket-associated action.

FIG. 6 illustrates a flowchart of an embodiment of a process 600 for responding to a user's initiation of a ticket-associated action. Process 600 begins at block 605, where account generator 205 generates an account for user 105. Account engine 160 detects activity from a user 105 at block 610. This activity may include the user logging his account (e.g., by entering his username and password) or opening an app on his phone (where he remains logged into his account during app executions). At block 615, user validator 210 identifies an account for the user. A block 620, the user is granted access to tickets associated with the identified account.

At block 625, ticket-action initiator 220 detects initiation of a ticket-associated action from a user. For example, the ticket engine 165 may detect that the user is attempting to obtain a new ticket, to transfer a ticket, or to use the ticket. Thus, the action need not be associated with a ticket for which the user has current access to. In some instances, at block 630, payment engine 225 processes a payment for the ticket-associated action. The payment processing may including collecting a payment from the user or crediting a payment to a user's account, credit card, etc. The ticket action is performed, and one or more ticket databases 180 are then updated in accordance with any completed ticket-associated action at block 635. For example, a ticket may be added to a ticket database 180 of the user, a ticket may be deleted or invalidated from a ticket database 180 at the user and added to another user's ticket database, or ticket in a central ticket database 180 may be modified.

Figure 7:
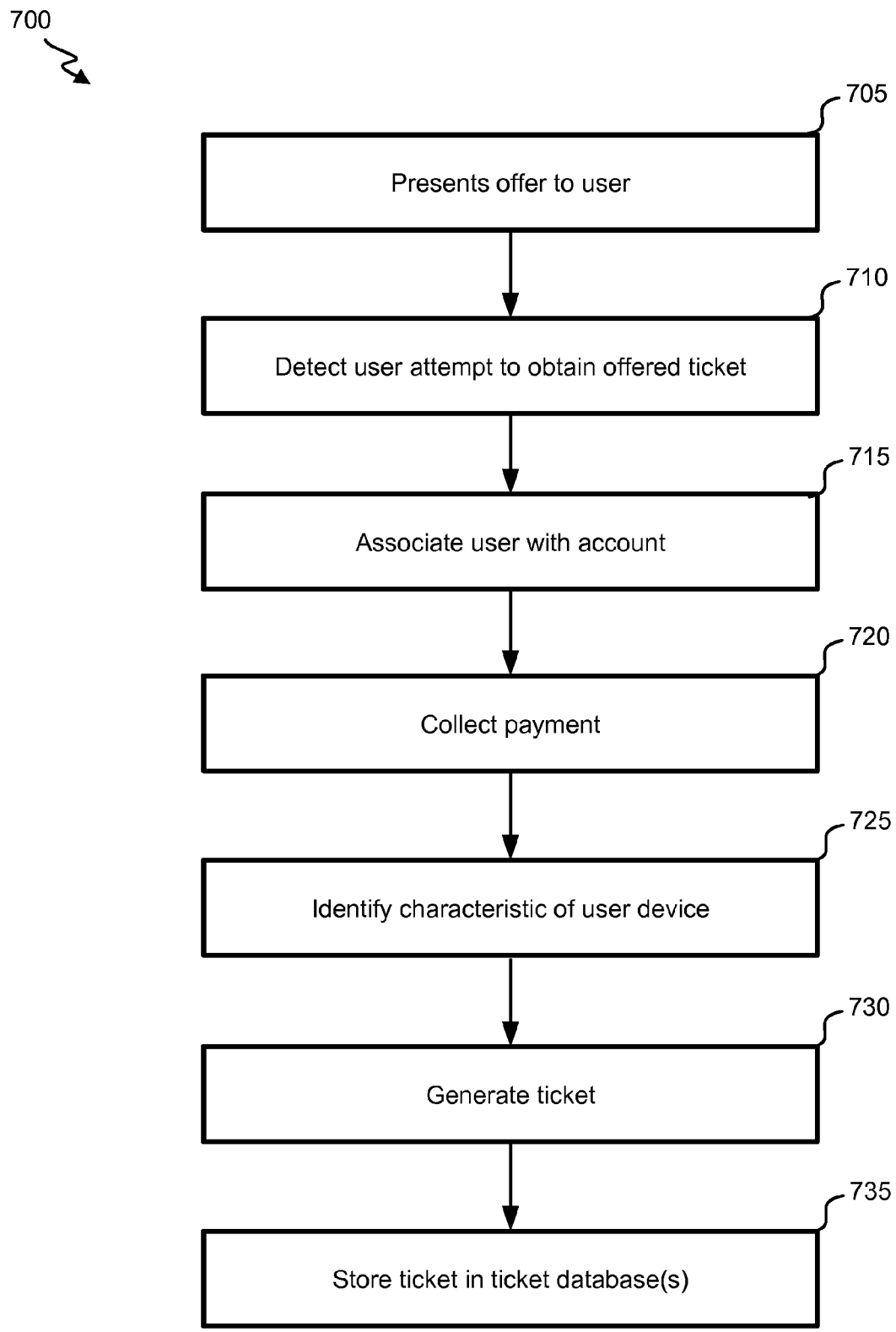
FIG. 7 illustrates a flowchart of an embodiment of a process for issuing a ticket to a user.

FIG. 7 illustrates a flowchart of an embodiment of a process 700 for issuing a ticket to a user 105. Process 700 begins at block 705, where ticket offerer 315 presents an offer to a user 105. At block 710, ticket-action initiator 220 detects that the user 105 is attempting to obtain the offered ticket. At block 715, the user validator 210 associates the user with an account. In some instances, the association is made based on a login from the user. For example, the user may have logged into his account prior to attempting to obtain the ticket. In some instances, the association requires that the user set up an account. This may be required when the user has not yet logged into his account and indicates that he has no existing account. At block 720, payment engine 225 collects any information and/or agreements from the user 105 needed for any payment required for the ticket. Payment manager 335 may identify to payment engine 225 what amount is to be collected and may further ensure that payment is completed.

Device identifier 340 identifies a characteristic of the device of the user 105 at block 725. The characteristic can include an identifier of the device (such as a MAC address), a type of the device, and/or an operating system on the device. The characteristic may be unique to the device or a combination of characteristics (or a single characteristic) can be sufficiently unique to make it unlikely that a person attempting to fraudulent use a ticket would have a device with a similar characteristic combination. In some instances, the characteristic is automatically detected. For example the characteristic may be determined based on the device that the user is using at the time at which the detection at block 710 is made. In some instances, the characteristic is determined based on information provided by the user. For example, the user may enter information identifying a device that the user intends to use while redeeming the ticket.

At block 730, ticket issuer 320 generates a ticket based on the ticket of interest identified a block 710 and on the identified device. Generation of the ticket may include generating a code, such as a code described with respect to FIG. 3. The ticket may also identify an event or service which the user can attend or receive upon redeeming the ticket, a date or dates of the event or service and/or a location or locations of the event or service. For example, the ticket may indicate that the ticket that can be redeemed for a dinner show at any of Joe's Theatres but that the ticket will expire on Dec. 31, 2014. This information may be presented in a manner such that it is clear to the user. For example it may be presented using words printed on the ticket. Alternatively or additionally, the information may be presented in a manner that may be understood by machines. For example, the expiration date may be included in a binary code.

Ticket issuer 320 stores the ticket in one or more ticket database is 180 at block 735. The ticket may be stored in a central ticket database 180 and/or a database 180 tied specifically to the user 105. In either case, the user 105 may be able to access the ticket using ticket accessor 215. For example, the user may be able to view or print the ticket.

Figure 8:
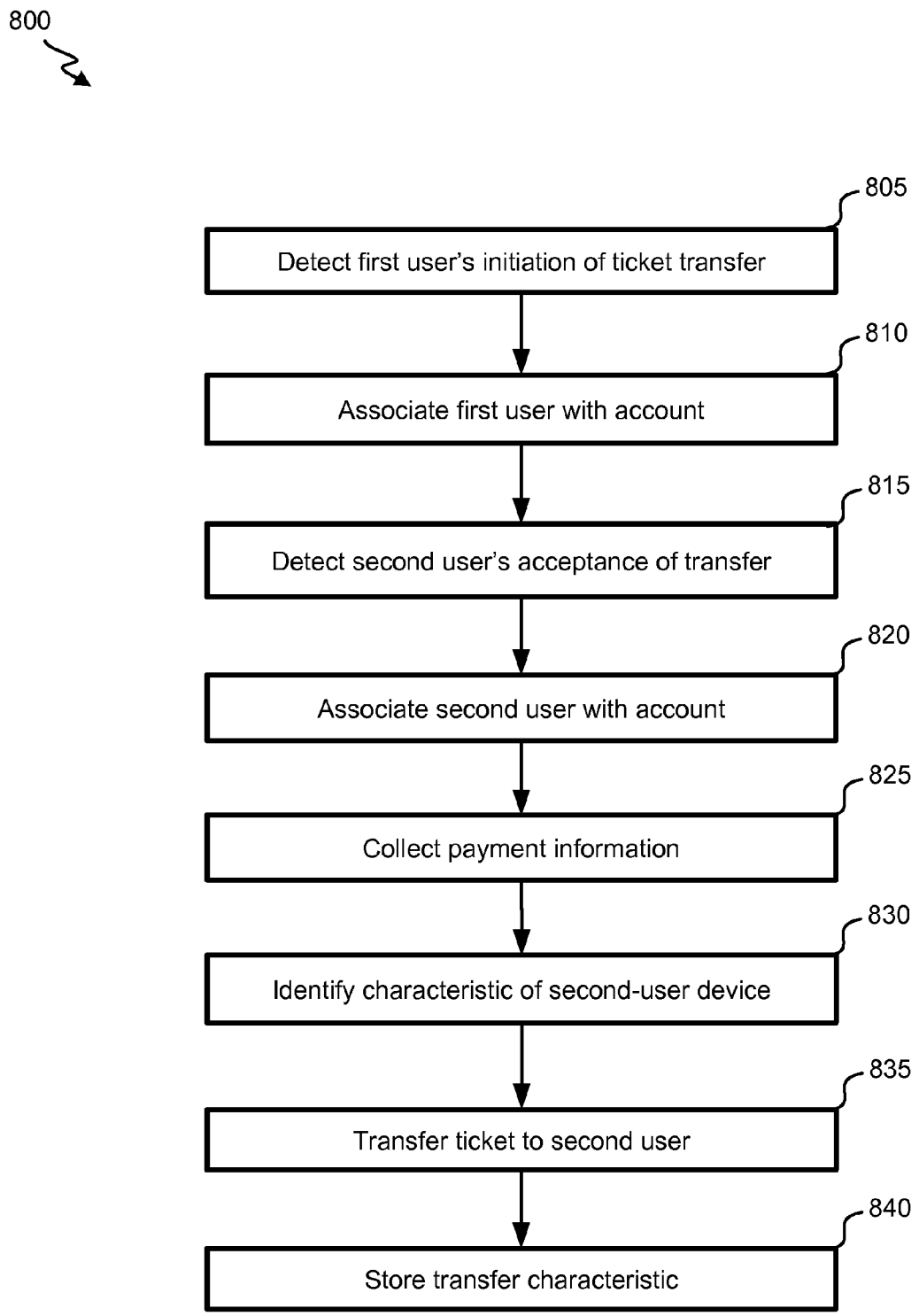
FIG. 8 illustrates a flowchart of an embodiment of a process for transferring a ticket from a first user to a second user.

FIG. 8 illustrates a flowchart of an embodiment of a process 800 for transferring a ticket from a first user to a second user. Process 800 begins at block 805, where ticket-action initiator 220 detects that the first user is attempting to initiate a ticket transfer. In some instances, the first user may be attempting to transfer the ticket to a specific second user. In some instances, the first user and be attempting to transfer the ticket to any second user who pays a purchase price or to a second user willing to pay highest purchase purpose. In these instances, ticket offerer 315 may present an offer to other potential second users, and the offer may include a price and/or information about the event or service associated with the ticket. At block 810, the first user is associated with an account. The association may be similar to the association is described with respect to block 715 in process 700.

At block 815, ticket-action initiator 220 detects that the second user is attempting to accept the ticket transfer. For example, the second user may indicate that he is willing to purchase the ticket or the second user may simply agree to the transfer. At block 820, the second user is associated with an account. The association may be similar to the association is described with respect to block 715 in process 700.

Payment information pertaining to the transfer is obtained at block 825. Specifically, payment engine 225 may collect information from the second user, and/or payment manager 335 may verify that any required payment has been completed. The payment may be one that is to be fully or partially credited to the first user and/or one that is to be fully or partially credited to a party controlling ticket management system 150. For example, ticket management system 150 may require a fixed or percentage fee to be collected from some or all transfers. In some embodiments, this fee is collected from the second user. In other embodiments, the fee is fully or partially collected from the first user.

Device identifier 340 identifies a characteristic device associated with the second user at block 830. The identification and/or the characteristic may be similar to any identification and/or a characteristic as described with respect to block 725 in process 700. Ticket transferer 325 then transfers ownership of the ticket from the first user to the second user at block 835.

The transfer may involve generating a new code or modifying an existing code. For example, the new or modified code may include a segment identifying the device associated with the second user. This segment may replace the previous segment identifying the device associated with the first user. The new or modified code may include a segment that identifies the second user. In some instances, the new or modified code includes information pertaining to the transfer. For example, the code may identify both the first user and the second user, the time and/or date of the transfer, and/or a price of the transfer.

The transfer may involve generating a new or modified ticket. For example, the new remote modified ticket may include the new or modified code and/or the name of the second user. The new or modified ticket may also include text information indicative of characteristics of the transfer.

The transfer may involve storing a new or modified ticket in a ticket database 180, deleting and outdated ticket from a ticket database 180, and/or updating a ticket in a ticket database 180. In one instance, the ticket is deleted from a ticket database 180 tied to the first user, and the new or modified ticket is added to a ticket database 185 tied to the second user. In one instance, a ticket in a central ticket database 180 is updated to indicate that the ticket is now associated with the second user. Any of these database modifications can influence which user can access and/or properly redeem the ticket. For example, the first user may no longer be able to access the ticket due to it not being present in a database tied to his account or due to it no longer being associated with his account in a central database. Meanwhile, the second user may be able to access the ticket due to a being present in a database tied to his account or due to it being associated with his account in the central database. In some instances, the first user may still be able to access the original ticket. However, the first user may be unable to redeem the original ticket, because, for example, the code on the original ticket may be identified within the ticket management system 150 as being invalid.

Ticket tracker 345 detects characteristics of the transfer and stores the characteristics in the ticket-history database 190 at block 840. The detected characteristics can include an identification of the first user, an identification of the second user, a date of the transfer, a price received by the first user for the transfer, a price received by ticket management system 150 for the transfer, and/or a code or segment of the new or modified ticket. Ticket history may be collected across a plurality of transfers. Part or all of the history may be provided to a vendor.

Figure 9:
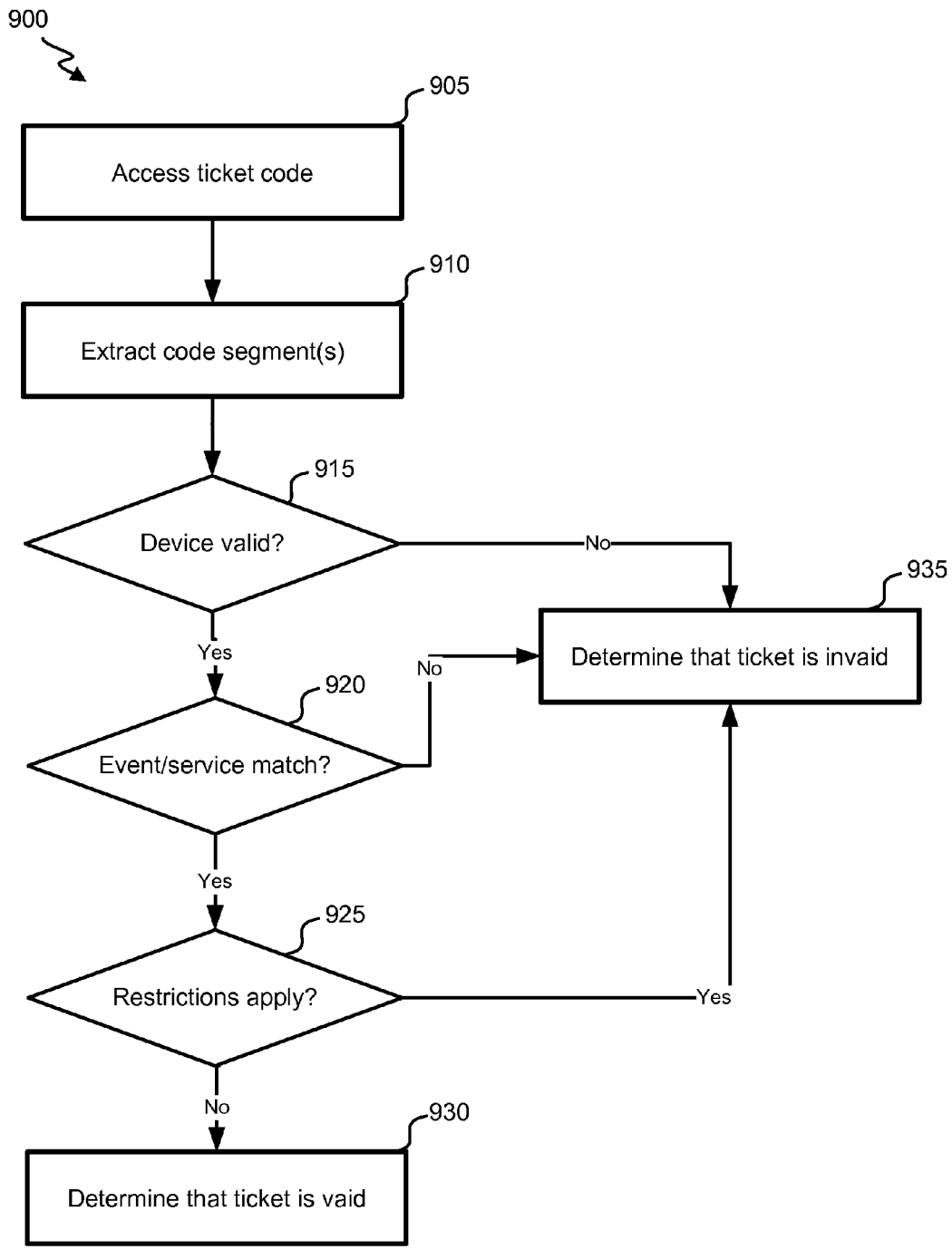
FIG. 9 illustrates a flowchart of an embodiment of a process for evaluating a ticket's validity.

FIG. 9 illustrates a flowchart of an embodiment of a process 900 for evaluating a ticket's validity. Process 900 begins at block 905, where ticket extractor 405 accesses a code from a ticket. For example, the accessed code may be one on a ticket's barcode scanned by agent device 130, an alphanumeric code entered by an agent 125 using agent device 130, an alphanumeric code wirelessly received by agent device 130 from user device 110 or an alphanumeric code retrieved from storage on user device 110. In some instances, accessing the code comprises decrypting an encrypted code (e.g., using a global, vendor-specific or offer-specific key).

Ticket extractor 405 extracts one or more segments from the code at block 910. These segments may be extracted based on digit placement or segment breaks. For example, various segments may routinely be separated by specific characters, or specific segments may be reliably encoded between certain digit placements in the code, such that the extraction can be systematically performed.

At block 915, device validator 410 uses an extracted segment to validate a device. The device being validated may be one used by a user while presenting the ticket. For example, a user may attempt to redeem a ticket by displaying the ticket on a handheld electronic device. The device validator 410 can identify a characteristic of the user's device and compare by characteristic to one identified using an extracted segment. For example, an extracted segment can include a MAC address, which can be compared to the MAC address of the user's device.

If the device is validated, process 900 continues to block 920 where offer validator 415 uses an extracted segment to determine whether the ticket can be used for a present event or service. For example, this segment may be indicative a particular concert, and offer validator 415 may access additional information indicating which concert is currently being hosted at a particular venue. As another example, the segment may indicate a date and time of an event, and offer validator 415 may determine whether a current date and time is similar to the indicated date.

If the offer is validated, process 900 continues to block 925 where restriction evaluator 420 determines whether any restrictions associated with the ticket or offer prohibit redemption of the ticket. For example, restriction evaluator 420 may access the blacklist of people prohibited from attending an event. If the restriction evaluator 420 does not identify a restriction prohibiting the ticket redemption, process 900 continues to block 930 where the ticket is determined to be valid. In some instances, the ticket can then be redeemed such that a user is granted access to an event or service, after which a code associated the ticket is invalidated in a central ticket database 180.

In some instances, process 900 includes additional validations. For example, a segment may indicate a date on which the code was generated, and a central database may store a most recent generation date for each ticket. These values can be compared to determine whether the presented ticket included the most recently generated code.

Figure 10:
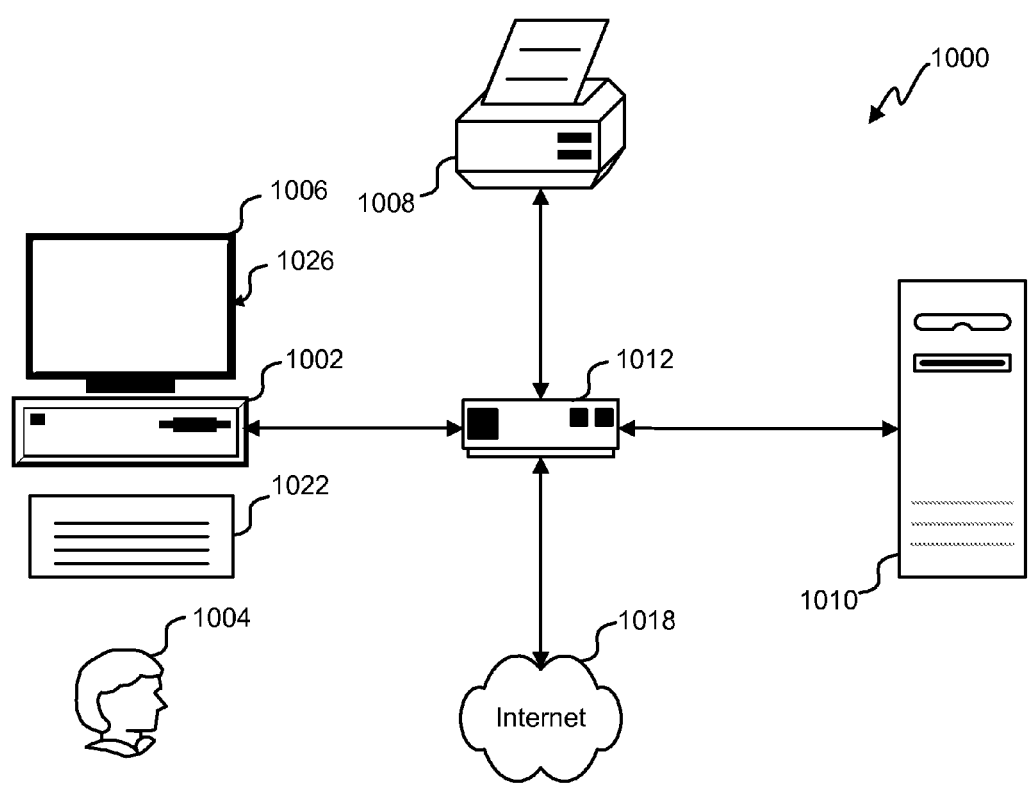
FIG. 10 depicts a block diagram of an embodiment of a computer system.

Referring next to FIG. 10, an exemplary environment with which embodiments may be implemented is shown with a computer system 1000 that can be used by a designer 1004 to design, for example, electronic designs. The computer system 1000 can include a computer 1002, keyboard 1022, a network router 1012, a printer 1008, and a monitor 1006. The monitor 1006, processor 1002 and keyboard 1022 are part of a computer system 1026, which can be a laptop computer, desktop computer, handheld computer, mainframe computer, etc. Monitor 1006 can be a CRT, flat screen, etc.

A designer 1004 can input commands into computer 1002 using various input devices, such as a mouse, keyboard 1022, track ball, touch screen, etc. If the computer system 1000 comprises a mainframe, a designer 1004 can access computer 1002 using, for example, a terminal or terminal interface. Additionally, computer system 1026 may be connected to a printer 1008 and a server 1010 using a network router 1012, which may connect to the Internet 1018 or a WAN.

Server 1010 may, for example, be used to store additional software programs and data. In one embodiment, software implementing the systems and methods described herein can be stored on a storage medium in server 1010. Thus, the software can be run from the storage medium in server 1010. In another embodiment, software implementing the systems and methods described herein can be stored on a storage medium in computer 1002. Thus, the software can be run from the storage medium in computer system 1026. Therefore, in this embodiment, the software can be used whether or not computer 1002 is connected to network router 1012. Printer 1008 may be connected directly to computer 1002, in which case, computer system 1026 can print whether or not it is connected to network router 1012.

Figure 11:
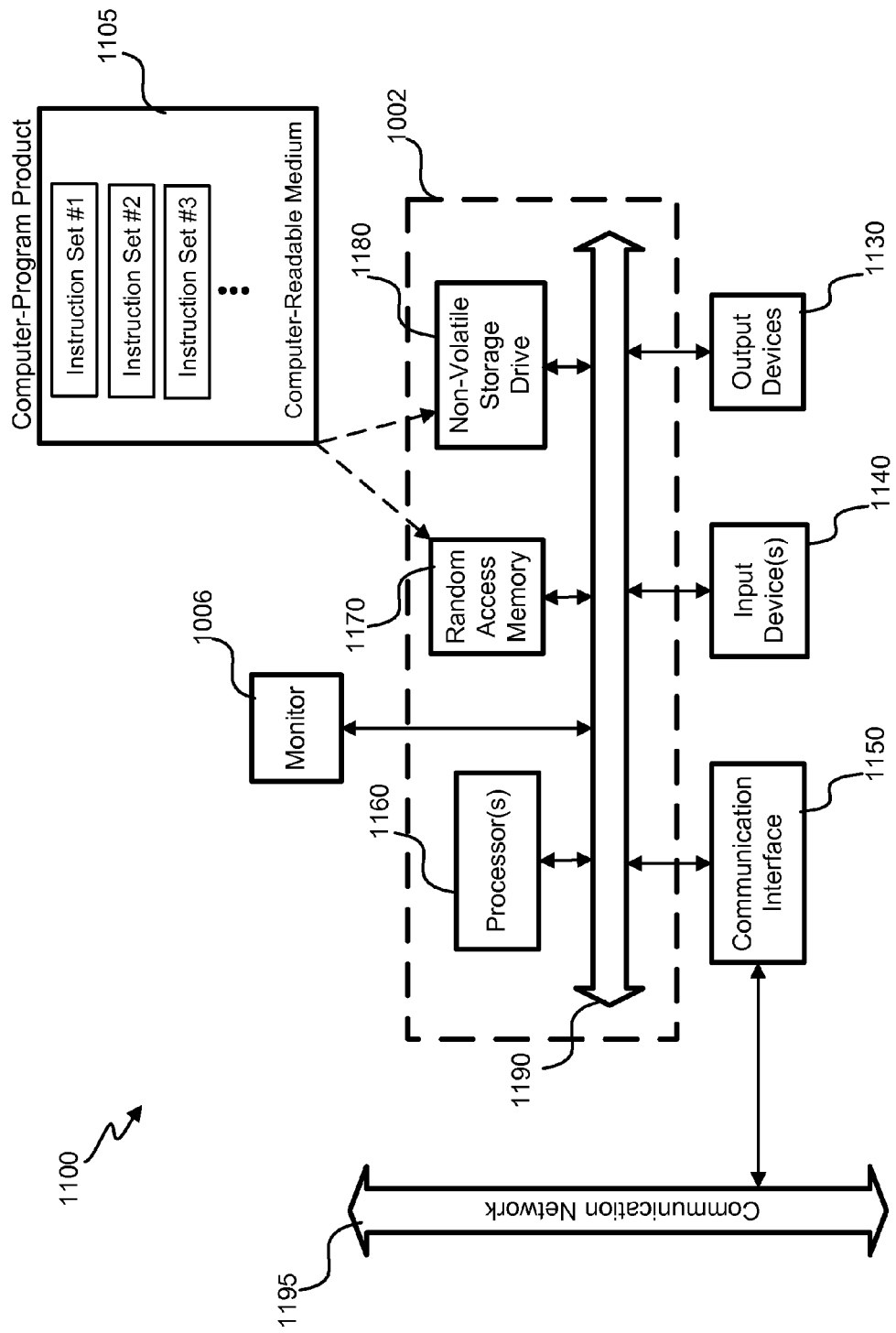
FIG. 11 depicts a block diagram of an embodiment of a special-purpose computer system.

With reference to FIG. 11, an embodiment of a special-purpose computer system 1100 is shown. One or more of account engine 160, ticket engine 165 and ticket evaluator 170 and/or any components thereof are examples of a special-purpose computer system 1100. Thus, for example, one or more special-purpose computer systems 110 may be used to provide the function of ticket management system 150. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1026, it is transformed into the special-purpose computer system 1100.

Special-purpose computer system 1100 comprises a computer 1002, a monitor 1006 coupled to computer 1002, one or more additional user output devices 1130 (optional) coupled to computer 1002, one or more user input devices 1140 (e.g., keyboard, mouse, track ball, touch screen) coupled to computer 1002, an optional communications interface 1150 coupled to computer 1002, a computer-program product 1105 stored in a tangible computer-readable memory in computer 1002. Computer-program product 1105 directs system 1100 to perform the above-described methods. Computer 1002 may include one or more processors 1160 that communicate with a number of peripheral devices via a bus subsystem 1190. These peripheral devices may include user output device(s) 1130, user input device(s) 1140, communications interface 1150, and a storage subsystem, such as random access memory (RAM) 1170 and non-volatile storage drive 1180 (e.g., disk drive, optical drive, solid state drive), which are forms of tangible computer-readable memory.

Computer-program product 1105 may be stored in non-volatile storage drive 1190 or another computer-readable medium accessible to computer 1002 and loaded into memory 1170. Each processor 1160 may comprise a microprocessor, such as a microprocessor from Intel® or Advanced Micro Devices, Inc.®, or the like. To support computer-program product 1105, the computer 1002 runs an operating system that handles the communications of product 1105 with the above-noted components, as well as the communications between the above-noted components in support of the computer-program product 1105. Exemplary operating systems include Windows® or the like from Microsoft Corporation, Solaris® from Sun Microsystems, LINUX, UNIX, and the like.

User input devices 1140 include all possible types of devices and mechanisms to input information to computer system 1002. These may include a keyboard, a keypad, a mouse, a scanner, a digital drawing pad, a touch screen incorporated into the display, audio input devices such as voice recognition systems, microphones, and other types of input devices. In various embodiments, user input devices 1140 are typically embodied as a computer mouse, a trackball, a track pad, a joystick, wireless remote, a drawing tablet, a voice command system. User input devices 1140 typically allow a user to select objects, icons, text and the like that appear on the monitor 1006 via a command such as a click of a button or the like. User output devices 1130 include all possible types of devices and mechanisms to output information from computer 1002. These may include a display (e.g., monitor 1006), printers, non-visual displays such as audio output devices, etc.

Communications interface 1150 provides an interface to other communication networks and devices and may serve as an interface to receive data from and transmit data to other systems, WANs and/or the Internet 1018. Embodiments of communications interface 1150 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1150 may be coupled to a computer network, to a FireWire® bus, or the like. In other embodiments, communications interface 1150 may be physically integrated on the motherboard of computer 1002, and/or may be a software program, or the like.

RAM 1170 and non-volatile storage drive 1180 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1170 and non-volatile storage drive 1180 may be configured to store the basic programming and data constructs that provide the functionality of various embodiments of the present invention, as described above.

Software instruction sets that provide the functionality of the present invention may be stored in RAM 1170 and non-volatile storage drive 1180. These instruction sets or code may be executed by processor(s) 1160. RAM 1170 and non-volatile storage drive 1180 may also provide a repository to store data and data structures used in accordance with the present invention. RAM 1170 and non-volatile storage drive 1180 may include a number of memories including a main random access memory (RAM) to store of instructions and data during program execution and a read-only memory (ROM) in which fixed instructions are stored. RAM 1170 and non-volatile storage drive 1180 may include a file storage subsystem providing persistent (non-volatile) storage of program and/or data files. RAM 1170 and non-volatile storage drive 1180 may also include removable storage systems, such as removable flash memory.

Bus subsystem 1190 provides a mechanism to allow the various components and subsystems of computer 1002 communicate with each other as intended. Although bus subsystem 1190 is shown schematically as a single bus, alternative embodiments of the bus subsystem may utilize multiple busses or communication paths within computer 1002.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, ticket passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A ticket management system for centrally and dynamically managing assignments of tickets to users, the ticket management system comprising:

an account engine that:
allows a first user to access a first account, the first account being configured to have the capability of allowing the first user to access any tickets owned by the first user, the first user owning a ticket, ownership of a ticket by a user providing the user with the right to redeem the ticket to attend an event, wherein a group of tickets comprises the ticket, and all tickets in the group of tickets provide respective users owning the ticket the right to redeem it to attend a particular event, and allows a second user to access a second account, the second account being configured to have the capability of allowing the second user to access any tickets owned by the second user;

a ticket transferer that transfers ownership of the ticket from the first user to the second user, such that, subsequent to the transfer, the second user has the right to redeem the ticket but the first user does not;

a device identifier that determines a first identifier of a first device associated with the second account and predicted to be used in an attempt to redeem the transferred ticket, the first identifier including a first MAC address and uniquely identifying the first device among other devices;

and a code generator that transforms, using a processor, a first code associated with the ticket prior to transfer and the first identifier of the first device associated with the second account into a second code for the transferred ticket, the second code including the first identifier of the first device associated with the second account, the first code including another identifier of another device associated with the first account, wherein redeeming the transferred ticket to attend the particular event comprises: receiving the second code at a second device from the first device associated with the second account, the second code including the first MAC address and uniquely identifying the first device among other devices, and determining by the second device that the received second code identifier corresponds to the first identifier including the first MAC address of the first device from which the second code was received.

2. The ticket management system for centrally and dynamically managing assignments of tickets to users as recited in claim 1, wherein:
the ticket provides a right to attend the particular event on a particular date, and
the second code is presented on the ticket only once it is a predetermined time before the particular date.

3. The ticket management system for centrally and dynamically managing assignments of tickets to users as recited in claim 1, wherein the second code comprises a plurality of segments, a first segment of the plurality of segments identifying the first identifier of the first device, and a second segment of the plurality of segments identifying the particular event.

4. The ticket management system for centrally and dynamically managing assignments of tickets to users as recited in claim 1, wherein the second code includes an identifier of a seat.

5. The ticket management system for centrally and dynamically managing assignments of tickets to users as recited in claim 1, further comprising a ticket tracker that identifies a history of the ticket, the history of the ticket including an indication that the ownership of the ticket was transferred to the second user.

6. The ticket management system for centrally and dynamically managing assignments of tickets to users as recited in claim 1, wherein the ownership of the ticket is transferred from the first user to the second users in response to detecting activity from at least one of the first user and the second user, the activity including a request for or agreement to the transfer.

7. The ticket management system for centrally and dynamically managing assignments of tickets to users as recited in claim 1, further comprising a payment manager that, prior to the transfer of ownership of the ticket from the first user to the second user, ensures that a payment has been collected from the second user.

8. The ticket management system for centrally and dynamically managing assignments of tickets to users as recited in claim 7, wherein the ticket manager further sends part, but not all, of the payment to the first user.

9. A method for centrally and dynamically managing assignments of tickets to users, the method comprising:
allowing a first user to access a first account, the first account being configured to have the capability of allowing the first user to access any tickets owned by the first user, the first user owning a ticket, ownership of a ticket by a user providing the user with the right to redeem the ticket to attend an event, wherein a group of tickets comprises the ticket, and all tickets in the group of tickets provide respective users owning the ticket the right to redeem it to attend a particular event;
allowing a second user to access a second account, the second account being configured to have the capability of allowing the second user to access any tickets owned by the second user;
transferring ownership of the ticket from the first user to the second user, such that, subsequent to the transfer, the second user has the right to redeem the ticket but the first user does not;
determining a first identifier of a first device associated with the second account and predicted to be used in an attempt to redeem the transferred ticket, the first identifier including a first MAC address and uniquely identifying the first device among other devices; and
transforming, using a processor, a first code associated with the ticket prior to transfer and the first identifier of the first device associated with the second account into a second code for the transferred ticket, the second code including the first identifier of the first device associated with the second account, the first code including another identifier of another device associated with the first account,
wherein redeeming the transferred ticket to attend the particular event comprises: receiving the second code at a second device from the first device associated with the second account, the second code including the first MAC address and uniquely identifying the first device among other devices,
and determining by the second device that the received second code identifier corresponds to the first identifier including the first MAC address of the first device from which the second code was received.

10. The method for centrally and dynamically managing assignments of tickets to users as recited in claim 9, wherein:
the ticket provides a right to attend the particular event on a particular date, and
the second code is presented on the ticket only once it is a predetermined time before the particular date.

11. The method for centrally and dynamically managing assignments of tickets to users as recited in claim 9, wherein the second code comprises a plurality of segments, a first segment of the plurality of segments identifying the first identifier of the first device, and a second segment of the plurality of segments identifying the particular event.

12. The method for centrally and dynamically managing assignments of tickets to users as recited in claim 9, wherein the second code includes an identifier of a seat.

13. The method for centrally and dynamically managing assignments of tickets to users as recited in claim 9, further comprising storing a history for the ticket, the history including an indication that the ownership of the ticket was transferred to the second user.

14. The method for centrally and dynamically managing assignments of tickets to users as recited in claim 9, further comprising detecting activity from at least one of the first user and the second user, the activity including a request for or agreement to the transfer, wherein the ownership of the ticket is transferred from the first user to the second user in response to detecting the activity.

15. The method for centrally and dynamically managing assignments of tickets to users as recited in claim 9, further comprising ensuring that a payment has been collected from the second user prior to transferring the ownership of the ticket from the first user to the second user.

16. The method for centrally and dynamically managing assignments of tickets to users as recited in claim 15, further comprising sending part, but not all, of the payment to the first user.

17. The method for centrally and dynamically managing assignments of tickets to users as recited in claim 9, wherein the ticket is configured such that it can be viewed on a portable electronic device and redeemed by showing the viewed ticket to a ticket taker.

18. A ticket management system for centrally and dynamically managing assignments of tickets to users, the ticket management system comprising:
one or more processors; and
one or more memories coupled with the one or more processors, wherein the one or more processors and one or more memories are configured to:
allow a first user to access a first account, the first account being configured to have the capability of allowing the first user to access any tickets owned by the first user, the first user owning a ticket, ownership of a ticket by a user providing the user with the right to redeem the ticket to attend an event, wherein a group of tickets comprises the ticket, and all tickets in the group of tickets provide respective users owning the ticket the right to redeem it to attend a particular event, allow a second user to access a second account, the second account being configured to have the capability of allowing the second user to access any tickets owned by the second user;

transfer ownership of the ticket from the first user to the second user, such that, subsequent to the transfer, the second user has the right to redeem the ticket but the first user does not;

determine first identifier of a first device associated with the second account and predicted to be used in an attempt to redeem the transferred ticket, the first identifier including a first MAC address and uniquely identifying the first device among other devices; and transform, using a processor, a first code associated with the ticket prior to transfer and the first identifier of the first device associated with the second account into a second code for the transferred ticket, the second code including the first identifier of the first device associated with the second account, the first code including another identifier of another device associated with the first account, wherein redeeming the transferred ticket to attend the particular event comprises:

receiving the second code at a second device from the first device associated with the second account, the second code including the first MAC address and uniquely identifying the first device among other devices, and determining by the second device that the received second code identifier corresponds to the first identifier including the first MAC address of the first device from which the second code was received.

19. The ticket management system for centrally and dynamically managing assignments of tickets to users as recited in claim 18, wherein:

the ticket provides a right to attend the particular event on a particular date, and the second code is presented on the ticket only once it is a predetermined time before the particular date.

20. The ticket management system for centrally and dynamically managing assignments of tickets to users as recited in claim 18, wherein the one or more processors and one or more memories are further configured to store a history for the ticket, the history including an indication that the ticket was transferred to the second user.

* * * * *

UNITED STATES PATENT AND TRADEMARK OFFICE
CERTIFICATE OF CORRECTION

| | | |
|---|---|---|
| PATENT NO. | : 9,251,518 B2 | Page 1 of 1 |
| APPLICATION NO. | : 14/202218 | |
| DATED | : December 1, 2015 | |
| INVENTOR(S) | : Levin et al. | |

It is certified that error appears in the above-identified patent and that said Letters Patent is hereby corrected as shown below:

Title Page:

Item (57), ABSTRACT, line 1 of the Abstract paragraph, please delete "any their" and insert --any of their--.

Item (57), ABSTRACT, line 2 of the Abstract paragraph, please delete "ticket" and insert --tickets--.

In the Claims:

In Column 19, line 17, Claim 6: please delete "users" and insert --user--.

Signed and Sealed this
Tenth Day of May, 2016

Michelle K. Lee
*Director of the United States Patent and Trademark Office*